3,082,179
METHOD OF PREPARING PLASTIC ARTICLES EXHIBITING VARIEGATED COLORS AND RESULTING ARTICLE
Harold A. Miller, White Plains, and William P. Kurtenbach, Peekskill, N.Y., assignors to Francis Earle Laboratories, Inc., Peekskill, N.Y., a corporation of New York
No Drawing. Filed Oct. 21, 1960, Ser. No. 63,986
6 Claims. (Cl. 260—17)

This invention relates to colored cast pearl plastics, and more particularly to imparting color or a play of colors to such plastics without the actual use of colored substances.

Plastic objects such as sheets or rods are commonly made to have a pearly luster by means of incorporating, prior to coating, nacreous or pearlescent pigments in the appropriate liquid, which may be a monomer, a partially polymerized polymer, or a solution of polymer in monomer. The finished object has an integral pearly luster. Pearl plastic sheets of this type may be used to make simulated pearl buttons, while pearl rods are used in the manufacture of lustrous beads and other decorative articles. Nacreous pigments include natural pearl essence which contains the crystalline guanine obtained from fish, and such synthetic pearlescent pigments as basic lead carbonate, lead hydrogen arsenate, lead hydrogen phosphate, bismuth oxychloride, etc. All of these derive their nacreous or pearly luster from lamellar particles of high index of refraction. Plastics which are utilized in the preparation of cast pearl objects include polymethyl methacrylate, other acrylates, polystyrene, and polyester, epoxy, phenol formaldehyde, amine formaldehyde, glyceryl phthalate, and allyl resins.

Although such cast pearl plastic objects resemble natural mother-of-pearl in having similar pearly luster, they differ from the natural product because of the uniformity of their color. The use of conventional nacreous pigments gives the plastic a silvery-whitish color, which may tend toward blue or yellow, but does not impart a play of colors such as is seen in natural pearls or mother-of-pearl.

Accordingly, it is one object of this invention to provide a play of colors in plastic objects without the use of dyes or other colored substances.

It is a further object to provide such color effects as an integral part of the cast object, rather than as a surface film.

These and other objects will be apparent from the following description.

In the usual method for making plastic pearl objects, the nacreous pigment, consisting of a suspension of lamellar crystals in a suitable liquid vehicle, is dispersed in a casting resin. For example, a nacreous pigment preparation of natural pearl essence crystals in dibutyl phthalate and butyl acetate, and containing some nitrocellulose, is dispersed in methyl methacrylate semipolymer. After catalyst is added, the suspension is poured into a suitable mold which is then immersed in a warm water bath or oven. The pearl essence crystals must be oriented parallel to one another and generally parallel to the surface of the cast object in order to produce the maximum pearly effect, which is caused by multiple reflections from many parallel layers; orientation occurs when the crystals align themselves in the flowing solution, the flow being accomplished by the filling operation, by convection currents, or by mechanical agitation, depending on the desired effects.

In this familiar technique, the vehicle for the pearl essence crystals is one which is compatible with the plastic in question. Thus the crystals remain discretely dispersed without danger of agglomeration, and there is introduced no tendency toward the clouding of the clear plastic. For example, cellulose nitrate in very low concentrations meets these requirements for casting in methyl methacrylate.

In accordance with the present invention, a small quantity of polymeric material which is incompatible with, i.e. insoluble in, the cast plastic is incorporated in the nacreous casting medium, most conveniently and effectively by being made part of the crystal vehicle. The incompatible polymeric substance is a film-forming organic material which is substantially free of color, i.e. sufficiently colorless, so as not to contribute appreciable color of its own to the final cast plastic. The therm "film-forming" as used herein includes what are sometimes termed "film-modifying" materials, i.e., substances which do not necessarily yield a dry film of suitable characteristics on their own: some may produce a tacky film, others a relatively brittle film, etc., and would be used in conjunction with other known film-forming substances.

The presence of the incompatible polymer produces a play of colors by means of an optical effect which is hereinafter discussed in detail. An examination of the cast by reflected and transmitted light demonstrates that the effect is not caused by discoloration or by the addition of a colored substance, since one view of the color appears as the approximate complement (in terms of colored light, not colored pigment) to another view. If an actual colored substance were present, all views of the casting would usually exhibit the same color. Further, the color both by reflected and transmitted light varies with the angle of observation, which is generally not the case if the color is produced by dyes or colored pigments.

The method for producing the colored pearl plastics of this invention involves the presence of a polymeric material which is not compatible with the cast resin and of a nacreous pigment consisting of lamellar crystals with smooth, flat surfaces, and having a relatively high index of refraction, i.e., at least 1.70. The incompatible polymeric material will ordinarily be incorporated in the medium in which the nacreous pigment particles are suspended. The pigment containing the polymeric additive as part of the pigment medium is then dispersed in a monomer, semi-polymer or solution of polymer in monomer, the mixture subsequently being placed into a suitable mold and polymerized under conditions dictated by the specific casting resin used. Prior to polymerization a catalyst is commonly added. Generally polymerization will occur at or above ambient temperature, suitably between about 15° C. and 100° C. and will take from about five minutes to twenty-four hours. In adapting these conditions to the specific resin involved, it should, for example, be apparent that when casting methyl methacrylate or polystyrene under pressure, somewhat higher temperatures may be employed.

The nacreous pigment may utilize either natural or the various synthetic pearlescent pigments hereinabove referred to. Preferably the final cast resin contains in the range of 0.1 to 2 percent of the nacreous pigment particles, although suitable results could also be obtained through the use of .05 to 5 percent of the nacre-producing particles.

The pigment particles are in the form of smooth, flat surfaced lamellae, which, depending on the material used, would generally be between about 1–50 microns in diameter and in the range of 5–250 millimicrons in thickness. As previously stated the lamellae should have indices of refractions of at least 1.70. In this connection, it should be noted that guanine, basic lead carbonate, lead hydrogen arsenate, molybdenum trioxide, and certain types of high index glass platelets all fall within this designation.

The particular colors obtained result from the specific conditions of the method. The color is dependent on the concentrations of the incompatible polymeric additive, lamellae and catalyst, if any; on the age of the pearl casting suspension prior to polymerization; on the time and temperatures of polymerization; on the initial viscosity, method of preparation, and composition of the casting monomer or semipolymer; and on the type of orientation of the lamellar crystals. Generally desirable color effects are obtained when the completed cast resin contains from .001 to 1.0 percent of the incompatible polymer. The color effect is weak at lower concentrations, whereas with higher concentrations there is danger of causing gross agglomeration of the lamellar crystals. The intensity of color may be enhanced by permitting the pearl resin to age at room temperature or below for from several hours to several days prior to casting although attractive color is obtained without any aging at all.

By way of example, the desired color effects are obtained when using, as the polymer incompatible with the cast resin, ethyl cellulose, cellulose esters (i.e., cellulose acetate, propionate, butyrate or mixtures thereof), alkyd resins, polyvinyl acetate and chloride-acetate copolymer, silicones, shellac, phenolic resins, polyvinyl formal and acrylonitrile-styrene copolymer, the choice of polymer depending on the casting resin utilized.

Typical casting resins which are employed in the present process would include polymethyl methacrylate and other acrylic esters, polystyrene and its copolymers, diallyl phthalate, polyesters, epoxy, phenol formaldehyde, urea formaldehyde and glyceryl phthalate resins.

The range of incompatible polymeric resin additives which are effective in producing color is seen from the following table:

| Casting Resin | Polymeric Additive |
| --- | --- |
| Epoxy resin (the polymeric condensation product of an epihalohydrin and a polyhydroxy phenol). | Cellulose acetate. Cellulose acetate butyrate. Cellulose nitrate. Ethyl cellulose. Melamine formaldehyde resin. Polyvinyl chloride-acetate copolymer. Rosin-modified phenolic resin. Styrenated polyester. |
| Methyl methacrylate | Non-drying oil modified alkyd resin. Cellulose acetate. Cellulose acetate butyrate. Ethyl cellulose. Polyvinylidene chloride. Rosin-modified phenolic resin. Shellac. Silicone resin. |
| Polyester and styrenated polyester. | Cellulose acetate. Cellulose acetate butyrate. Ethyl cellulose. Polybutene. Polyvinyl acetate. Polyvinyl chloride-acetate copolymer. Polyvinylidene chloride. Shellac. Silicone resin. |
| Styrene | Cellulose acetate. Cellulose acetate butyrate. Cellulose nitrate. Methyl methacrylate. Methyl acrylate. Polyvinyl acetate. Polyvinyl chloride. Shellac. Silicone resin. |

In producing the desired color effects, it has been found that the colors tend to be more intense when the time of polymerization is greater. The play of colors is greater when the completed sheet is mottled, areas of lustrous pearl being alternated with relatively dull areas. Such patterning can be achieved by various mechanical devices, such as permitting air bubbles to rise up through the syrup prior to polymerization, or by filling the mold in a manner which leaves residual flow lines (this is best accomplished with syrups of quite high viscosity), or by moving wires or other objects through the pearl syrup during the early stages of polymerization.

A microscopic examination of the finished cast indicates that some of the crystals have become arranged in stacks or layers which are intensely colored, and which appear to be the source of the color of the entire cast. Although the color varies from one crystal stack to another, they are generally of a prevailing hue, showing various shades of a given color.

A sheet which has uniform pearl luster, i.e. which is unmottled, when examined by eye by transmitted light has the predominating color of the crystal stacks. In those cases where the colors of the individual stacks are more varied, the transmission color of the sheet is a blend of the individual colors. When the sheet is viewed by reflected light, the color is the complement (in terms of colored light) of that seen by transmission. The color also changes if the sheet is turned slowly so that the light which at first came perpendicularly through the sheet is viewed instead at various angles. For example, an unmottled cast which has a golden color by reflected light is blue by perpendicular transmission. As it is rotated, the transmission color becomes purple and then yellow. Another cast which is bluish-green by reflected light is reddish-yellow by perpendicular transmission. On rotation it becomes decidedly yellow.

When the cast sheet is mottled, areas with one orientation of crystals are followed successively by other orientations, thus permitting variations in color to appear. Further, the orientation of lamellae in the deeper layers of the cast determines to what extent the crystals nearer the top are viewed by transmitted as well as by reflected light, the apparent color at any point being dependent on the ratio of these two components. Thus, varied orientation produces a multitude of colors even though the crystal stacks in which the color appears to originate may be colored rather uniformly.

These observations are consistent with the view that each microscopic crystal stack behaves like an interference film wherein by tilting the stacks, the length of the light path through the interference film is changed, causing a variation in the colors which are reflected and transmitted.

Without wishing to be bound by any particular mechanism, it is suggested that the incompatible polymer is adsorbed to the surface of the crystals and acts as a binder for the formation of crystal "sandwiches" when two or more such crystals approach each other. It is probably the thickness of the polymer layer between crystals which establishes the color of the cast. The resulting sandwiches or stacks may involve a plurality of crystals.

This mechanism is consistent also with the observation that the incompatible polymer is much less effective if added after the nacreous crystals are already suspended in the casting resin instead of first being incorporated in the nacreous pigment preparation. If first suspended in the casting resin, the crystals presumably become coated with this resin which reduces the likelihood of adsorbing the incompatible polymer. Similarly, the addition of a compatible polymer, such as cellulose nitrate in the case of cast methyl methacrylate, may diminish the effect of the incompatible polymer, possibly by displacing it from the crystal surface.

The principles of this invention are further illustrated by the following examples:

*Example I*

A nacreous basic lead carbonate suspension (2.0 grams) of the composition:

35.0% basic lead carbonate
3.0% cellulose acetate (approx. 53% acetyl content)
17.0% methyl Cellosolve
45.0% methyl Cellosolve acetate is dispersed in 100 grams of methyl methacrylate semipolymer which has been prepared by heating at 60° C. a 0.02 percent solution in methyl methacrylate monomer of a 25 percent solution of acetyl peroxide in dimethyl phthalate. The syrup has a viscosity of about 700 c.p.s. An additional 1.0 percent of the catalyst solution is added. After three hours, the mixture is poured into a rod-shaped mold of 0.5 inch in diameter, and is polymerized by immersion overnight in a water bath at 45° C. The cast rod, which is suitable for making into beads for costume jewelry, has a predominantly pink color by reflected light, and is light green by transmitted light. Both colors are apparent simultaneously, however, because of the varying orientation which follows the curvature of the rod.

*Example II*

A natural pearl essence (2.5 grams) with the composition:

10.0% pearl essence crystals
2.0% ethyl cellulose
48.0% n-amyl acetate
40.0% diethyl phthalate is dispersed in 500 grams of methyl methacrylate syrup which consists of 15 percent polymethyl methacrylate granules dissolved in methyl methacrylate monomer. The syrup has a viscosity of about 3300 c.p.s. The pearl essence is dispersed most effectively by the slow and careful addition of the methacrylate syrup to the essence with good stirring. To the mixture are added 10 grams of a 25 percent solution of acetyl peroxide in dibutyl phthalate. The dispersion is poured into a mold consisting of two glass platelets separated by a gasket which may consist of rubber tubing wrapped in cellopane or of Teflon tubing, and of such diameter that the distance between the two glass plates is about ⅜ inch. The filled mold is placed in a water bath at 50° C. for five hours. The completed cast on removal from the mold resembles mother-of-pearl and has a predominantly yellowish-green color of delicate hue by reflected light and appears lavender by transmitted light. The cast sheet is suitable for cutting into simulated mother-of-pearl buttons.

*Example III*

A pearl essence with a composition of:

11.0% pearl essence crystals
0.8% ethyl cellulose
38.2% n-butyl acetate
50.0% dibutyl phthalate is dispersed in a methacrylate syrup made by the method described in connection with Example I which has a viscosity at 20° C. of approximately 900 c.p.s. Catalyst is added to give a mixture with the following composition:

1.0% pearl essence i.e. (0.11% guanine crystals) (0.008 ethyl cellulose)
1.0% of a 45% paste of benzoyl peroxide in dibutyl phthalate i.e. 0.45% benzoyl peroxide
98.0% polymethyl methacrylate (900 c.p.s.)

This mixture is poured into a mold for the making of a cast sheet. The mold consists of two glass plates separated by flexible tubing which serves as a gasket. Polymerization is accomplished by heating overnight in a water bath at 40° C. The finished cast sheet has pearl luster enhanced by variable color of a predominantly red hue when viewed by reflected light and predominantly blue-green when viewed by transmitted light.

*Example IV*

A pearl essence like that of Example III (3.0 grams) is dispersed in 150 grams of an unsaturated, thermosetting liquid polyester composition. The latter was prepared by mixing one part by weight of styrene and two parts by weight of polyester formed by condensation of 6 moles of propylene glycol, 5 moles of maleic acid, and 1 mole of phthalic acid anhydride at about 180° C. To the mixture is added 0.25% of methyl ethyl ketone peroxide. Polymerization is effected by pouring into a mold consisting of glass plates and gasket (as in Example III) and immersing in a water bath at 70° C. for 60 minutes. The completed polyester sheet has a predominantly pink color by reflected light, green by transmitted light.

*Example V*

A nacreous lead hydrogen arsenate paste of the following composition:

40.0% lead hydrogen arsenate crystals
3.0% alkyd resin (phthalic anhydride-glycerol)
30.0% toluol
27.0% methyl Cellosolve is dispersed in the methacrylate syrup of Example III, to the extent of 3.0 grams of nacreous paste to 100 grams of methyl methacrylate syrup. The mixture is catalyzed as in Example III, and then is aged at 5° C. for two days. It is then cast at 50° C. The resulting pearl sheet is golden by reflected light, lavender by transmitted light.

*Example VI*

A nacreous basic lead carbonate paste of the following composition:

40% basic lead carbonate crystals
4% urea-formaldehyde resin solids, e.g. Uformite F-200 E (Rohm and Haas Co.)
18% xylol
20% methyl Cellosolve
18% butanol is dispersed in styrene semi-polymer to the extent of 4.0 grams of the nacreous paste to 100 grams of semi-polymer. The semi-polymer has been prepared by heating styrene at 75° C. in the absence of catalyst until a convenient viscosity, e.g. 700 c.p.s., is obtained. The pearl dispersion is catalyzed by the addition of 0.25% benzoyl peroxide. The mixture is then cast at 60° C. in the form of a thin sheet; after solidification, the polystyrene polymerization is completed by heating to 150° C. for one hour. The resulting polystyrene pearl sheet is green by reflected light, red by transmitted.

*Example VII*

A nacreous lead hydrogen arsenate paste of the following composition:

35% lead hydrogen arsenate
4% polyvinyl acetate-chloride, e.g. Vinylite VAGH (Bakelite Division, Union Carbide Chemicals Co.)
30% acetone
31% methyl isobutyl ketone is added to the extent of 2 parts in 100 parts of epoxy casting resin. To the pearl casting resin are added 10 grams of diethylene triamine. The resin is poured into a suitable mold and is cured in 2 hours at 85° C. The completed pearl epoxy casting appears gold by reflected light, and violet by transmitted.

Each of these examples demonstrates the casting of a liquid resin in which are incorporated both lamellar crystals and an organic polymeric additive which is incompatible with the cast resin, but soluble or dispersible in the casting liquid monomer, semi-polymer, or casting resin. In the above description and examples, various combinations of these materials have been illustrated. Other combinations of these materials should be obvious to those skilled in the art as would be the various techniques which may be utilized in obtaining variegated orientation of the lamellar crystals.

The concentration of incompatible polymeric additive which gives optimum effects depends in large part on the degree of incompatibility. The cellulosic derivatives used as incompatible additives in Examples I through III are very incompatible with methyl methacrylate, and give best results in the range 0.001 to 0.1 percent of incompatible polymer in the final cast plastic. The alkyd resin of Example IV is relatively more compatible, and gives optimum results in the range 0.01 to 1.0 percent in the final cast plastic.

In the foregoing, this invention has been described only in connection with preferred embodiments thereof. Many variations and modifications of the principles of this invention within the scope of the description herein are obvious. Accordingly, it is preferred to be bound not by the specific disclosure herein, but only by the appending claims.

This is a continuation-in-part of our application Serial No. 673,106, filed July 22, 1957, now abandoned.

We claim:

1. A method for preparing a light-transmitting plastic article exhibiting variegated colors, comprising adding to a casting liquid selected from the group consisting of polyesters, epoxy resins and polystyrene, a substantially colorless film-forming solution of a polymer incompatible with said casting liquid selected from the group consisting of alkyd resins, ethyl cellulose and cellulose esters, said solution having suspended therein a nacreous pigment with particles of a diameter not greater than 50 microns and an index of refraction of at least 1.70, the incompatible polymer and nacreous pigment being admixed in said solution in proportions such that the plastic article cast therefrom contains from 0.001% to 1.0% of the incompatible polymer and from 0.05% to 5% of the nacreous pigment, casting the resulting mixture of said casting liquid, nacreous pigment and incompatible polymer and polymerizing said mixture at a temperature of at least 15° C. to form the light-transmitting colored plastic article.

2. A light-transmitting plastic article made in accordance with the method of claim 1.

3. A method for preparing a light-transmitting plastic article exhibiting variegated colors, comprising adding to a casting liquid selected from the group consisting of polyesters, epoxy resins and polystyrene, a nacreous pigment having particles of a diameter not greater than 50 microns and an index of refraction of at least 1.70, said pigment being suspended in a vehicle which includes therein a light-transmitting substantially colorless, film-forming solution of a polymer incompatible with said casting liquid, said polymer being selected from the group consisting of alkyd resins, ethyl cellulose and cellulose esters, and the polymer and the nacreous pigment being admixed in proportions such that the plastic article cast therefrom contains from 0.001% to 1.0% of the incompatible polymer and from 0.1% to 2% of the nacreous pigment, placing the mixture in a mold, and then subjecting it to a temperature in the range of from 15° C. to 100° C. for from 5 minutes to 24 hours to thereby polymerize the mixture to form the solid light-transmitting colored plastic article.

4. The method of claim 3 in which the nacreous pigment is natural pearl essence.

5. The method of claim 3 in which the nacreous pigment is basic lead carbonate.

6. The method for preparing a light-transmitting plastic article exhibiting variegated colors, comprising adding to incompletely polymerized liquid methyl methacrylate, a substantially colorless film-forming solution of ethyl cellulose having suspended therein natural pearl essence with particles not greater than 50 microns and an index of refraction of at least 1.70, said solution containing the ethyl cellulose and natural pearl essence in proportions such that the plastic article cast therefrom contains from 0.001% to 1.0% ethyl cellulose and from 0.1% to 2% natural pearl essence, and then casting the mixture of the liquid methacrylate and the solution of ethyl cellulose and natural pearl essence and polymerizing said mixture at a temperature of at least 15° C. to form the desired colored plastic article.

References Cited in the file of this patent

UNITED STATES PATENTS 2,168,331     Field et al. _____ Aug. 8, 1939
2,941,895     Haslam _____ June 21, 1960

OTHER REFERENCES

Burrell: "A Survey of Novelty Finishes," Organic Finishing, January 1956, pages 16–21.